US005245330A

United States Patent [19]

Wassink

[11] Patent Number: 5,245,330

[45] Date of Patent: Sep. 14, 1993

[54] MICROPROCESSOR-CONTROLLED APPARATUS WITH IMPROVED DISABLING

[75] Inventor: Derk J. C. Wassink, Eindhoven, Netherlands

[73] Assignee: U. S. Philips Corporation, New York, N.Y.

[21] Appl. No.: 757,096

[22] Filed: Sep. 10, 1991

[30] Foreign Application Priority Data

Sep. 17, 1990 [NL] Netherlands ........................ 9002035

[51] Int. Cl.5 ............................ G06F 7/04; H04Q 7/00

[52] U.S. Cl. ............................ 340/825.34; 340/825.3; 340/825.31; 340/825.32; 307/10.2

[58] Field of Search ...................... 340/825.31, 825.32, 340/825.34, 568, 571, 825.3; 307/10.2; 364/184

[56] References Cited

U.S. PATENT DOCUMENTS

| | | | |
|---|---|---|---|
| 4,494,114 | 1/1985 | Kaish | 340/825.31 |
| 4,604,708 | 8/1986 | Lewis | 340/825.31 |
| 4,683,462 | 7/1987 | Takeda et al. | 340/825.32 |
| 4,734,896 | 3/1988 | Soma et al. | 307/10.2 |
| 4,743,894 | 5/1988 | Bochmann | 340/825.32 |
| 4,808,981 | 2/1989 | Seibold | 307/10.2 |
| 4,838,377 | 6/1989 | Kozaki et al. | 307/10.2 |

FOREIGN PATENT DOCUMENTS

| | | |
|---|---|---|
| 0350119A | 1/1990 | European Pat. Off. . |
| 8304138 | 7/1985 | Netherlands . |

OTHER PUBLICATIONS

Liell, P., Elektronic, vol. 27, No. 13, p. 46, Nov. 1978.

*Primary Examiner*—Donald J. Yusko
*Assistant Examiner*—Andrew M. Hill
*Attorney, Agent, or Firm*—David R. Treacy

[57] ABSTRACT

Microprocessor-controlled apparatus, for example, a car radio whose microprocessor (5) is one-time programmable by the manufacturer of the apparatus. An external non-volatile memory (7) comprises a security variable (VAR) indicating whether the protection means is operational. In addition to a security code (SC), an arbitrary code series (KEY) of, for example, 20 bits is stored in the internal memory (51) of the microprocessor. Unauthorized disabling of the protection means by external interrogation of the non-volatile memory is only possible by assigning a value which corresponds to the code series to the security variable. However, the code series is inaccessible and can only be traced with great difficulty by means of trial and error methods.

12 Claims, 2 Drawing Sheets

MICROPROCESSOR-CONTROLLED APPARATUS WITH IMPROVED DISABLING

BACKGROUND OF THE INVENTION

The invention relates to a microprocessor-controlled apparatus including an anti-theft protection means which can be disabled. More particularly, the invention relates to a consumer apparatus which is considered liable to theft. Such an apparatus may be, for example, a car radio, CD player, video recorder, camera recorder, and the like.

An apparatus of the type described in the opening paragraph is known from Netherlands Patent Application NL 8304138. A control circuit in this known apparatus is adapted, inter alia, to perform a legitimation program for putting the apparatus into operation after it has been connected to the supply voltage. The legitimation program comprises a comparison of a legitimation code, entered by the user, with a security code stored in a first memory. Unauthorized use of the apparatus is thus prevented, rendering theft unattractive.

In practice it has been found useful to offer the owner of an apparatus the facility of disabling the anti-theft protection means. This is notably the case when using a car radio which is mounted in a so-called slide and is each time taken along by the owner in order to prevent car damage caused by burglars. To this end the apparatus comprises a second memory for storing a security variable which is constituted in the known apparatus by an indication bit indicating whether the protection means is enabled. If the protection means is not enabled, the legitimation program is not performed so that the car radio can be readily put into operation after it has been placed in the slide. Said second memory for storing the security variable is necessarily a non-volatile RAM. In practice it is constituted by an external memory coupled to the microprocessor. The known apparatus has the drawback that such an external memory is externally accessible to frauds. For example, the indication bit of a protected car radio can be read with the aid of auxiliary means and stored again after inversion. The car radio is then no longer protected and is therefore attractive to the illegal trade.

SUMMARY OF THE INVENTION

It is an object of the invention to provide a microprocessor-controlled apparatus including an anti-theft protection means which can be disabled and which obviates the drawbacks mentioned above and considerably reduces the risk of theft.

To this end the apparatus according to the invention is characterized in that an internal memory of the microprocessor comprises a code series and in that the control circuit is adapted to assign a value corresponding to the code series to the security variable stored in the second memory so as to indicate that the protection means is disabled. It is thereby achieved that external reading of the security variable in the second, external memory does not yield any useful information for unauthorized use of the apparatus. In fact, in an apparatus with its protection means enabled, the security variable which has been read has a value which is independent of the code series, for example, the value of zero. Overwriting of this value by another value with the aid of external auxiliary means has no effect at all, unless the value corresponding to the code series is known and is written into the memory. However, the code series is even unknown to the owner and cannot be read from the inaccessible internal memory of the microprocessor. The code series may be arbitrarily extensive, thus discouraging the use of "trial and error" methods to a sufficient extent. The code series can of course be read from the apparatus whose protection means has already been disabled. However, for obvious reasons this is useless.

A further embodiment of the apparatus is characterized in that the control circuit is adapted to perform the legitimation program after a predetermined time delay after the apparatus has been put into operation, if the security variable does not have the value corresponding to the code series. Any attempt to "break" the code series, for example, by successively writing different values of the security variable into the second memory by means of a personal computer can only be checked for the achieved effect after said period of time has elapsed. For the authorized user, who wants to put a protected apparatus into operation quickly, said period of time may be made acceptably short by giving the code series a sufficient length.

In practice it is desirable that only the authorized user can disable the protection means. A disable command intended for this purpose is to enter the correct legitimation code with which the desired adaptation of the security variable is realized. It is conceivable that it is attempted to trace the legitimation code by means of this method. For example, the effect of successively generated legitimation codes on the security variable stored in the external memory can be analysed with the aid of external auxiliary means. In order to impede this, a further embodiment of the apparatus is characterized in that the control circuit is adapted to assign the value corresponding to the code series to the security variable when a predetermined period of time after the disable command has elapsed. Any "trial and error"attempt to trace the legitimation code in this way can now be checked for the desired effect only after this period of time has elapsed. In practice the period of time will be chosen to be sufficiently long so as to avoid inconveniently long legitimation codes. Similar considerations also apply when the protection means is enabled again in response to an enable command.

A further embodiment of the apparatus is characterized in that the security code is also stored in the internal memory of the microprocessor. It is thereby achieved that, likewise as the code series, the security code is not externally accessible. It is to be noted that it is known per se from U.S. Pat. No. 4,494,114 to store the security code in the internal memory of the microprocessor which is externally inaccessible. However, this Patent refers to an apparatus which is not provided with an anti-theft protection means which can be disabled.

The microprocessor is preferably of a type whose internal memory is one-time programmable. Unlike the conventional microprocessors, large numbers of which are provided with an identical program by the microprocessor manufacturer, this type of microprocessor is programmed by the apparatus manufacturer. It is thereby achieved that the apparatuses of one production batch can be provided with different code series and security codes. If the code series or the security code of an apparatus has possibly been "broken" successfully, it does not yield any information for unauthorized use of another apparatus from the same production batch. The code series programmed by the apparatus manufacturer may be arbitrary and need not be registered. The security code, for example, a 4-digit number is registered on a passport and handed over to the buyer of the relevant car radio. Said microprocessors which can be programmed once are known under the name of OTP (One Time Programmable).

DESCRIPTION OF THE PREFERRED EMBODIMENT

Figure 1:
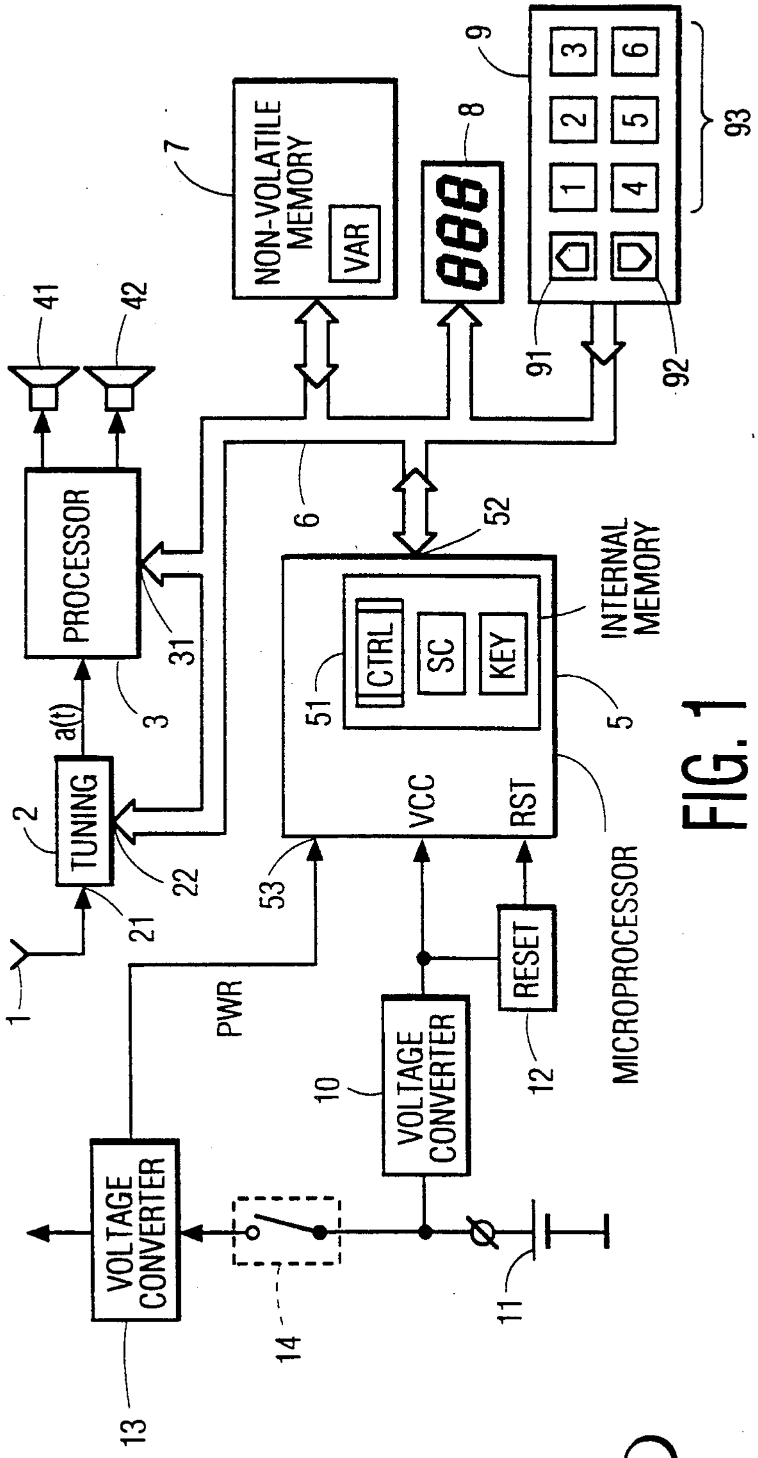
FIG. 1 shows a car radio as an embodiment of a microprocessor-controlled apparatus according to the invention.

FIG. 1 shows a car radio as an embodiment of a microprocessor-controlled apparatus having an anti-theft protection means which can be disabled. The car radio receives transmitter signals via an aerial 1, which signals are applied to a signal input 21 of a tuning circuit 2. Tuning to a transmitter is effected in response to tuning signals which are applied to a control input 22 of the tuning circuit. The tuning circuit 2 supplies a demodulated audio signal a(t) which is made audible in loudspeakers 41 and 42 via a signal processing circuit 3. In the signal processing circuit 3, inter alia, the volume, tone control, balance and the like of the audio signal are influenced by means of control signals which are applied to a control input 31.

The car radio further comprises a microprocessor 5, preferably of a one-time programmable type. An example of such a microprocessor is the type TMP47P800N of the firm of Toshiba. The microprocessor 5 comprises an internal memory 51 in which a control program CTRL and fixed data are stored by the car radio manufacturer. The fixed data comprise, inter alia, a security code SC and a code series KEY. The security code SC is a number comprising, for example, four decimal numbers, and the code series KEY is formed by a bit series of, for example, 20 bits. Unlike the control program CTRL, which is identical for all car radios from one production batch, the security code SC and the code series KEY preferably have a different value for each car radio. When the microprocessor is being programmed the security code SC is contained in the information material which is handed over to the buyer of the car radio. The code series KEY may be a completely arbitrary bit series and need not be disclosed.

The microprocessor 5 has a plurality of terminals 52 for transporting signals from and to the microprocessor. The connections connected thereto are shown in the form of a communication bus 6. The previously mentioned tuning signals and control signals are generated by the microprocessor and applied by means of this communication bus to the tuning circuit 2 and the signal processing circuit 3. A non-volatile memory 7, a display circuit 8 and an operating field 9 are coupled to the microprocessor by means of the communication bus. The non-volatile memory 7 is intended to store data therein which must not be lost when the apparatus is switched off; for example, tuning data of preset stations. The non-volatile memory is particularly adapted to store a security variable VAR which comprises as many bits as the previously mentioned code series KEY. The operating field 9 comprises search keys 91 and 92 for automatically searching transmitters and a plurality of program keys 93 for directly selecting previously programmed preset stations. The program keys 93 are also used for entering a legitimation code which will hereinafter be referred to as LC.

The microprocessor is connected by means of a voltage converter 10 to an external power supply source which is constituted by a battery 11 having a voltage of 12 Volts. The voltage converter 10 converts this voltage into a voltage of 5 Volts desired for the microprocessor and applies this voltage to a terminal VCC of the microprocessor. A power-on-reset circuit 12 further connected to the voltage converter 10 is adapted to generate a reset signal when the radio is connected to the battery and to apply this signal to a terminal denoted by RST in the Figure. The other circuits of the car radio receive their supply voltage from a further voltage converter 13 which is connected to the battery 11 via an on/off switch 14. This further voltage converter also applies a binary signal PWR to a terminal 53 of the microprocessor. This signal PWR indicates, for example, by means of the logic value "1" that the car radio is put into operation by means of the on/off switch 14.

Figure 2:
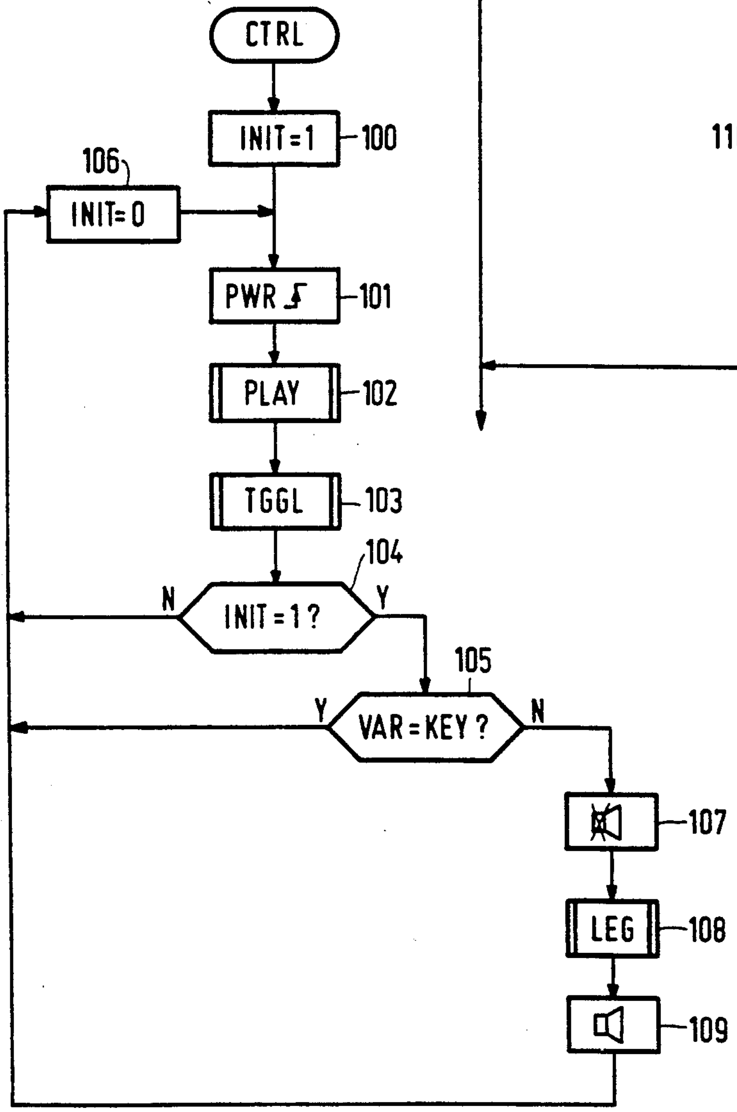

The operation of the car radio shown in FIG. 1 is completely determined by the control program CTRL which is stored in the internal memory 51 of the microprocessor 5. FIG. 2 shows a flow chart of this control program. It is started if the car radio is connected to the battery and if in response thereto the microprocessor receives the reset signal at the terminal RST. The car radio need not yet have been put into operation by means of the on/off switch 14 (see FIG. 1). The control program as yet only performs a step 100, i.e. it assigns the logic value "1" to a logic variable INIT. Subsequently the program waits in a step 101 until the signal PWR applied to the terminal 53 (see Fig. 1) assumes the logic value "1". The car radio has then been put into operation by means of the on/off switch 14. In a step 102 a background program PLAY is subsequently started. This program ensures the functional control of the car radio. It scans the keys of the operating field 9 (see FIG. 1) and in response thereto it controls the tuning circuit 2, the signal processing circuit 3 and the display circuit 8 in known manner.

Subsequently a toggle program TGGL is performed in a step 103. This toggle program provides the user with the possibility of optionally enabling or disabling the protection means of the car radio. It will hereinafter be described in greater detail.

In a step 104 it is subsequently checked whether the logic variable INIT has the value "1". This is the case if the car radio is put into operation for the first time after it has been connected to the battery. In a step 105 it is then checked whether the security variable VAR stored in the non-volatile memory 7 (see FIG. 1) corresponds to the code series KEY stored in the internal microprocessor memory 51 (see FIG. 1). If VAR and KEY are equal, the protection means of the car radio is disabled. The value "0" is then assigned in a step 106 to the logic variable INIT. The car radio then functions without any interference until the apparatus is switched off by means of the on/off switch 14 (see FIG. 1).

Figure 3:
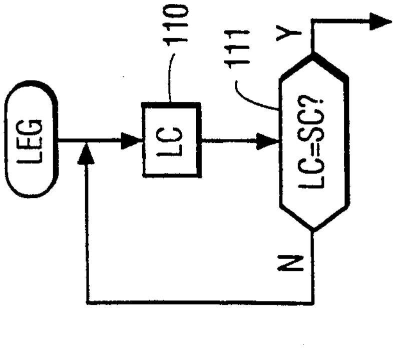
FIGS. 2-4 show flow charts to explain the operation of the car radio shown in FIG. 1.

If it has been determined in step 105 that the security variable VAR is not equal to the code series KEY, the protection means of the car radio is enabled. In a step 107 of the control program the sound reproduction is then disturbed, for example, by periodically suppressing the sound. Subsequently the user is given the opportunity to legitimize himself in a step 108. A legitimation program LEG suitable for this purpose is shown in FIG. 3. It comprises a step 110 for entering a legitimation code LC which is compared in a step 111 with the security code SC stored in the internal microprocessor memory 51 (see FIG. 1). The legitimation program is not left until the correct legitimation code has been entered. Meanwhile, the sound reproduction remains disturbed. When the correct code has been entered, the legitimation program is left. In a step 109 of the control program (see FIG. 2) the disturbance of the sound reproduction is eliminated and the value "0" is assigned in the step 106 to the logic variable INIT.

Whenever the car radio is put into operation by means of the on/off switch 14 (see Fig. I) without having been released from the battery, the control program is resumed as from the step 101. The logic variable INIT then invariably has the value "0". In the step 104 it is then determined that the legitimation program need no longer be run through, even if the protection means has been enabled.

Figure 4:
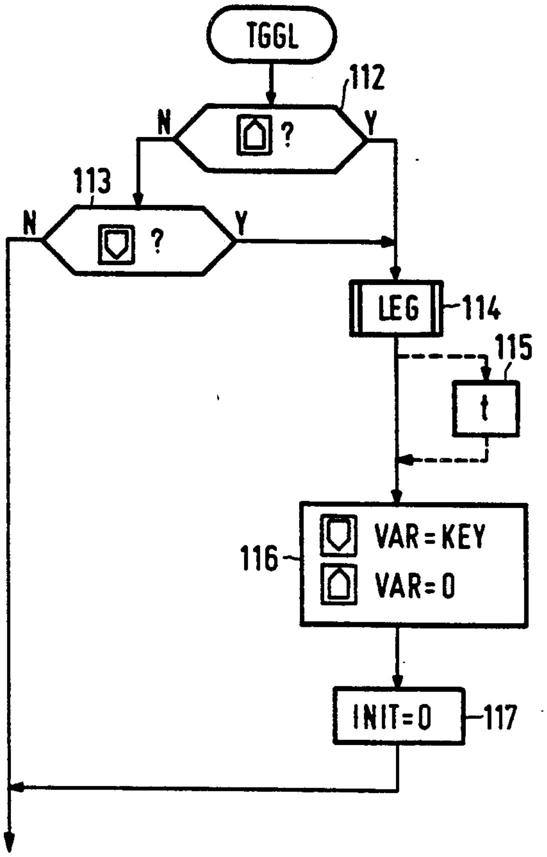

FIG. 4 illustrates the toggle program TGGL shown in FIG. 2 for enabling or disabling the protection means. In a step 112 of this toggle program it is checked whether the search key 91 of the operating field (see Fig. 1) was activated while the car radio was being put into operation. This is interpreted as a command for enabling the protection means. In a corresponding manner it is checked in a step 113 whether a command for disabling the protection means was generated by activating the search key 92 of the operating field while the car radio was being put into operation. If either one of the two cases occurs, the previously described legitimation program LEG is performed in a step 114. After the correct legitimation code has been received, the security variable VAR is adapted in a step 116. If it is a disable command, the value which corresponds to the code series KEY is assigned to VAR so as to indicate that the protection means is disabled, while VAR is assigned the value 0 when an enable command is concerned. The logic variable INIT (which has the value "1" when the relevant switch-on or switch-off procedure is performed after the car radio has been connected to the battery) is now assigned the value "0"in a step 117. FIG. 4 also shows an optional step 115 in which a predetermined waiting time is observed for adapting the security variable VAR in response to entering the legitimation code. It is thereby avoided that it can immediately be ascertained by means of interrogation of the non-volatile memory with the aid of external auxiliary means whether an arbitrarily entered legitimation code influences the value of VAR.

It is to be noted that it is useful to perform the step denoted by 107 in FIG. 2 for disturbing the sound reproduction in such a way that the first disturbance does not occur until after a predetermined period of time, for example, after 2 sec. If an arbitrary value for the security variable VAR is written in an unauthorized way and with external means into the non-volatile memory of a protected car radio, it will not be apparent until 2 sec after the car radio has been switched on whether it is still protected. If the code series KEY comprises 20 bits, it takes an average of $\frac{1}{2}\cdot 2^{20}\cdot 2$ sec, or 12 days, to break the code series in this manner and to disable the protection means in this unauthorized way. The first disturbance may occur for a short period, while the sound is subsequently reproduced undisturbed for some time. This is important when the car radio must be inspected after it has been built in by the garage mechanic and when the car radio must be serviced by a dealer.

I claim:

1. An apparatus comprising:
   a control microprocessor,
   a first memory, accessible to said microprocessor, for storing a security code,
   protection means coupled to and including circuitry within said microprocessor, comprising means for user entry of a legitimation code; responsive to occurrence of a given condition, said protection means blocking normal operation of the apparatus in the absence of user entry of a legitimation code corresponding to said security code, and
   means for disabling said protection means, including a non-volatile memory for storing a security variable whose value indicates whether or not said protection means is disabled,
   characterized in that said microprocessor comprises an internal memory for storing a code series consisting of a plurality of bits, and
   to indicate that said protection means is disabled, said means for disabling assigns a value corresponding to said code series to said security variable and stores such value in said non-volatile memory; while to indicate that said protection means is not disabled, a value of security variable independent of said code series is stored in said non-volatile memory.

2. An apparatus as claimed in claim 1, characterized in that said protection means includes said microprocessor being programmed to perform a legitimation program including said user entry of a legitimation code after a predetermined time delay following initiation of normal operation of the apparatus, if said security variable has a value different from said code series.

3. An apparatus as claimed in claim 2, characterized in that said means for disabling includes means for receiving a disable command, and means for delaying a predetermined period of time following receipt of said disable command before assigning said value corresponding to said code series to said security variable.

4. An apparatus as claimed in claim 3, comprising means for generating an enable command to enable said protection means, characterized in that said microprocessor is programmed to assign a value to said security variable different from said value corresponding to said code series only after a further predetermined period of time following generation of said enable command.

5. An apparatus as claimed in claim 2, comprising means for generating an enable command to enable said protection means, characterized in that said microprocessor is programmed to assign a value to said security variable different from said value corresponding to said code series only after a further predetermined period of time following generation of said enable command.

6. An apparatus as claimed in claim 1, comprising means for generating an enable command to enable said protection means, characterized in that said microprocessor is programmed to assign a value to said security variable different from said value corresponding to said code series only after a further predetermined period of time following generation of said enable command.

7. An apparatus as claimed in claim 1, characterized in that said first memory is a further internal memory of the microprocessor.

8. An apparatus as claimed in claim 7, characterized in that said microprocessor internal memories are one-time programmable.

9. An apparatus as claimed in claim 1, characterized in that said means for disabling includes means for receiving a disabling command, and means for delaying a predetermined period of time before assigning said value corresponding to said code series to said security variable.

10. An apparatus as claimed in claim 9, comprising means for generating a command to enable said protection means, characterized in that said microprocessor is programed to assign a value to said security variable different from said value corresponding to said code series only after a further predetermined period of time following generation of said command.

11. An apparatus comprising:

a control microprocessor, a first memory, accessible to said microprocessor, for storing a security code, protection means coupled to and including circuitry within said microprocessor, comprising means for user entry of a legitimation code; responsive to occurrence of a given condition, said protection means blocking normal operation of the apparatus in the absence of user entry of a legitimation code corresponding to said security code, and means for disabling said protection means, including a non-volatile memory for storing a security variable whose value indicates whether or not said protection means is disabled, characterized in that said microprocessor comprises an internal memory for storing a code series consisting of a multiplicity of bits, to indicate that said protection means is disabled, said means for disabling assigns a value corresponding to said code series to said security variable and stores such value in said non-volatile memory; while to indicate that said protection means is not disabled, a value of security variable independent of said code series is stored in said non-volatile memory, and responsive to occurrence of said given condition and the value of said security variable being different from said code series, said protection means blocks normal operation of the apparatus only after expiration of a predetermined time delay following initiation of normal operation.

12. An apparatus as claimed in claim 11, characterized in that said multiplicity of bits is approximately 20 bits.

* * * * *